(12) United States Patent
Malloy et al.

(10) Patent No.: US 9,812,225 B2
(45) Date of Patent: Nov. 7, 2017

(54) COMPACT INTEGRAL PRESSURIZED WATER NUCLEAR REACTOR

(75) Inventors: John D. Malloy, Goode, VA (US); Michael J. Edwards, Forest, VA (US)

(73) Assignee: BWXT mPower, Inc., Charlotte, NC (US)

( * ) Notice: Subject to any disclaimer, the term of this patent is extended or adjusted under 35 U.S.C. 154(b) by 665 days.

(21) Appl. No.: 13/085,527

(22) Filed: Apr. 13, 2011

(65) Prior Publication Data

US 2012/0263270 A1 Oct. 18, 2012

(51) Int. Cl.
| | |
|---|---|
| G21D 1/02 | (2006.01) |
| G21C 7/12 | (2006.01) |
| G21C 1/32 | (2006.01) |
| G21C 15/00 | (2006.01) |
| G21C 13/02 | (2006.01) |
| G21D 1/00 | (2006.01) |

(52) U.S. Cl.
CPC ............... *G21C 7/12* (2013.01); *G21C 1/326* (2013.01); *G21C 13/02* (2013.01); *G21C 15/00* (2013.01); *G21D 1/006* (2013.01); *Y02E 30/32* (2013.01); *Y02E 30/39* (2013.01)

(58) Field of Classification Search
USPC .......................................................... 376/402
See application file for complete search history.

(56) References Cited

U.S. PATENT DOCUMENTS

| | | |
|---|---|---|
| 2,961,393 A | 11/1960 | Monson |
| 3,236,739 A | 2/1966 | Lange et al. |
| 3,245,879 A | 4/1966 | Purdy et al. |
| 3,245,881 A | 4/1966 | Ammon et al. |
| 3,255,089 A | 6/1966 | Deighton |

(Continued)

FOREIGN PATENT DOCUMENTS

| | | |
|---|---|---|
| EP | 0164525 A1 | 12/1985 |
| GB | 2237441 A | 5/1991 |

(Continued)

OTHER PUBLICATIONS

International Search Report and Written Opinion for PCT/US2012/032872 dated Aug. 3, 2012.

(Continued)

*Primary Examiner* — Sean P Burke
(74) *Attorney, Agent, or Firm* — Nelson Mullins Riley & Scarborough LLP (57) ABSTRACT

A pressurized water reactor (PWR) includes a cylindrical pressure vessel defining a sealed volume, a nuclear reactor core disposed in a lower portion of the cylindrical pressure vessel, one or more control rod drive mechanisms (CRDMs) disposed in the cylindrical pressure vessel above the nuclear reactor core, and an annular steam generator surrounding the nuclear reactor core and the CRDM. In some such PWR, a cylindrical riser is disposed coaxially inside the pressure vessel and inside the annular steam generator and surrounds the nuclear reactor core and the CRDM, and the steam generator is disposed coaxially inside the cylindrical pressure vessel in an annular volume defined by the cylindrical pressure vessel and the cylindrical riser. In other such PWR, the steam generator is disposed coaxially outside of and secured with the cylindrical pressure vessel.

8 Claims, 5 Drawing Sheets

(56) References Cited

U.S. PATENT DOCUMENTS

| | | | |
|---|---|---|---|
| 3,325,374 A | | 6/1967 | Margen |
| 3,941,187 A | * | 3/1976 | Jabsen et al. ............... 165/157 |
| 4,002,936 A | | 1/1977 | Laing |
| 4,057,467 A | * | 11/1977 | Kostrzewa ............... 376/406 |
| 4,072,563 A | | 2/1978 | McDonald et al. |
| 4,235,672 A | | 11/1980 | Harand |
| 4,508,677 A | | 4/1985 | Craig et al. |
| 4,897,240 A | | 1/1990 | Sako |
| 5,053,190 A | | 10/1991 | Gardner et al. |
| 5,089,218 A | | 2/1992 | Gardner et al. |
| 5,335,252 A | * | 8/1994 | Kaufman ............... 376/402 |
| 5,465,280 A | | 11/1995 | Wedellsborg |
| 5,563,927 A | | 10/1996 | Siegel et al. |
| 5,583,900 A | | 12/1996 | Kasahara et al. |
| 5,715,288 A | | 2/1998 | Matteson |
| 5,789,720 A | | 8/1998 | LaGally et al. |
| 5,935,439 A | | 8/1999 | Hart et al. |
| 6,091,791 A | | 7/2000 | Matsumoto et al. |
| 6,259,760 B1 | | 7/2001 | Carelli et al. |
| 6,498,827 B1 | | 12/2002 | Klarner |
| 6,546,066 B2 | | 4/2003 | Baliga et al. |
| 6,618,460 B2 | | 9/2003 | Baliga et al. |
| 6,769,262 B1 | | 8/2004 | Gray |
| 6,772,832 B2 | | 8/2004 | Schneider |
| 6,795,518 B1 | | 9/2004 | Conway et al. |
| 6,810,101 B2 | | 10/2004 | Klarner |
| 6,888,908 B1 | | 5/2005 | Klarner et al. |
| 6,909,765 B2 | | 6/2005 | Lahoda |
| 6,944,255 B2 | * | 9/2005 | Hattori et al. ............... 376/405 |
| 6,997,141 B2 | | 2/2006 | Sun |
| 7,139,359 B2 | | 11/2006 | Baliga et al. |
| 7,154,982 B2 | | 12/2006 | Gautier et al. |
| 7,389,669 B2 | | 6/2008 | Badlani et al. |
| 7,567,645 B2 | | 7/2009 | Baliga |
| 2004/0017877 A1 | | 1/2004 | Hartel et al. |
| 2004/0114705 A1 | | 6/2004 | Kitch et al. |
| 2004/0136488 A1 | | 7/2004 | Tuite et al. |
| 2005/0018806 A1 | | 1/2005 | Gautier et al. |
| 2005/0117684 A1 | | 6/2005 | Klarner et al. |
| 2005/0190877 A1 | | 9/2005 | Knapp |
| 2005/0199591 A1 | | 9/2005 | Coe et al. |
| 2009/0010374 A1 | | 1/2009 | Nishiguchi et al. |
| 2010/0316177 A1 | | 12/2010 | Stambaugh et al. |
| 2010/0316181 A1 | | 12/2010 | Thome et al. |
| 2011/0194664 A1 | * | 8/2011 | Yokoyama et al. ......... 376/220 |
| 2011/0222640 A1 | | 9/2011 | DeSantis |

FOREIGN PATENT DOCUMENTS

| | | |
|---|---|---|
| JP | S58187894 A | 11/1983 |
| JP | S59995 U | 1/1984 |
| TW | 483004 | 4/2002 |

OTHER PUBLICATIONS

European Search Report dated Sep. 4, 2014 for EP Application No. 12771867.4.

Response dated Mar. 16, 2015 to European Search Report for EP Application No. 12771867.4.

Taiwanese Office Action dated May 14, 2015, for corresponding application No. 101112781.

Office Action dated Sep. 9, 2015 for Chinese Application No. 201210046933.5.

Office Action dated Nov. 24, 2015 for Japanese Application No. 2014-505211.

Second Office Action dated Apr. 29, 2016 for Chinese Application No. 201210046933.5.

"The design and safety features of the IRIS reactor", Mario D. Carelli, et al., Nuclear Engineering and Design 230 (pp. 151-167), 2004.

* cited by examiner

COMPACT INTEGRAL PRESSURIZED WATER NUCLEAR REACTOR

BACKGROUND

The following relates to the nuclear reactor arts, electrical power generation arts, and related arts.

Nuclear reactors employ a reactor core comprising a mass of fissile material, such as a material containing uranium oxide ($UO_2$) that is enriched in the fissile $^{235}U$ isotope. Primary coolant water, such as light water ($H_2O$) or heavy water ($D_2O$) or some mixture thereof, flows through the reactor core to extract heat for use in heating secondary coolant water to generate steam that is then used for some other useful purpose. For electrical power generation, the steam is used to drive a generator turbine. In thermal nuclear reactors, the water also serves as a neutron moderator that thermalizes neutrons, which enhances reactivity of the fissile material. Various reactivity control meachanisms, such as mechanically operated control rods, chemical treatment of the primary coolant with a soluble neutron poison, or so forth are employed to regulate the reactivity and resultant heat generation.

In a pressurized water reactor (PWR), the primary coolant water is maintained in a subcooled state in a sealed pressure vessel that also contains the reactor core. In the PWR, both pressure and temperature of the primary coolant water are controlled. One advantage of the PWR approach is that the primary coolant water, in which the radioactive reactor core is immersed, is contained within the pressure vessel.

For power generation, secondary coolant water is flowed in thermal communication with the primary coolant water. Heat (i.e., energy) is transferred from the reactor core to the secondary coolant water via the intermediary of the primary coolant water. This heat converts the secondary coolant water from liquid water to steam. The steam is typically flowed into a turbine or other power conversion apparatus that makes practical use of the steam power.

The apparatus providing thermal communication between the primary and secondary coolant water is referred to as the steam generator. In external steam generator designs, a large-diameter pressure vessel penetration carries primary coolant out of the pressure vessel into the external steam generator where it is flowed proximate to the secondary coolant water circuit. This approach has the disadvantage of taking primary coolant water outside of the pressure vessel, and of introducing a large-diameter vessel penetration for this purpose.

In internal steam generator designs, the steam generator is located (or "integrated") inside the pressure vessel. In these "integral PWR" designs, secondary coolant water is flowed into the internal steam generator (and hence into the pressure vessel) and is heated to produce steam that flows out of the pressure vessel. Advantages include typically smaller pressure vessel penetrations, and avoiding flow of primary coolant water out of the pressure vessel.

However, the integral PWR approach has some disadvantages. Placing the steam generator inside the pressure vessel increases the size of the pressure vessel, which has disadvantages in terms of manufacturing cost, transport cost (e.g., a larger rail transport car and/or specialized rail system), site considerations (e.g., a deeper subterranean containment structure), and safety (e.g., more difficult to maintain seal integrity as the size of the pressure vessel increases). For various reasons including safety and primary coolant flow circuit design, it is conventional to place the nuclear reactor core at or near the bottom of the pressure vessel. Primary coolant water heated by the reactor core naturally tends to rise through the pressure vessel as it cools (the "hot leg" of the primary circuit), and the cooling primary coolant then flows downward to return to the reactor core (the "cold leg" of the primary circuit). In assisted circulation designs, this natural circulation is augmented by primary coolant pumps. The internal steam generator is placed above the reactor core, typically in the cold leg.

An illustrative example of such an integral PWR is shown in Thome et al., "Integral Helical Coil Pressurized Water Nuclear Reactor", U.S. Pub. No. 2010/0316181 A1 published Dec. 16, 2010 which is incorporated herein by reference in its entirety. This publication discloses a steam generator employing helical steam generator tubing; however, other coil geometries including straight (e.g., vertical) steam generator tubes are also known. This publication also discloses an integral PWR in which the control rod drive mechanism (CRDM) is also internal to the pressure vessel; however, external CRDM designs are also known. Some illustrative examples of internal CRDM designs include: Stambaugh et al., "Control Rod Drive Mechanism for Nuclear Reactor", U.S. Pub. No. 2010/0316177 A1 published Dec. 16, 2010 which is incorporated herein by reference in its entirety; and Stambaugh et al., "Control Rod Drive Mechanism for Nuclear Reactor", Intl Pub. WO 2010/144563 A1 published Dec. 16, 2010 which is incorporated herein by reference in its entirety.

Disclosed herein are improvements that provide various benefits that will become apparent to the skilled artisan upon reading the following.

BRIEF SUMMARY

In one aspect of the disclosure, an apparatus comprises a pressurized water reactor (PWR) including: a cylindrical pressure vessel defining a sealed volume; a nuclear reactor core disposed in a lower portion of the cylindrical pressure vessel; one or more control rod drive mechanisms (CRDMs) disposed in the cylindrical pressure vessel above the nuclear reactor core; and an annular steam generator surrounding the nuclear reactor core and the CRDM. In some such PWR's, a cylindrical riser is disposed coaxially inside the pressure vessel and inside the annular steam generator and surrounds the nuclear reactor core and the CRDMs, and the steam generator is disposed coaxially inside the cylindrical pressure vessel in an annular volume defined by the cylindrical pressure vessel and the cylindrical riser. In other such PWR's, the steam generator is disposed coaxially outside of and secured with the cylindrical pressure vessel.

In another aspect of the disclosure, a method is performed in conjunction with a pressurized water reactor (PWR) including a pressure vessel defining a sealed volume containing primary coolant water, a nuclear reactor core disposed in a lower portion of the pressure vessel and immersed in the primary coolant water, a control rod drive mechanisms (CRDMs) disposed in the pressure vessel above the nuclear reactor core and immersed in the primary coolant water, and an annular steam generator disposed outside of and secured with the pressure vessel. The annular steam generator includes tubes having ends in fluid communication with the sealed volume of the pressure vessel and a secondary coolant flow volume in which the tubes are disposed. The secondary coolant flow volume is not in fluid communication with the sealed volume of the pressure vessel. In the method, the PWR is operated to cause nuclear reactivity of the nuclear reactor core to heat the primary coolant water, the primary coolant water is circulated in a circuit including downward flow of primary coolant water outside of the pressure vessel through the tubes of the annular steam generator, and secondary coolant water is flowed upward through the secondary coolant flow volume where the heating and circulating cooperate to convert the primary coolant water to steam.

In another aspect of the disclosure, an apparatus comprises a pressurized water reactor (PWR) and an annular steam generator. The PWR includes: a pressure vessel defining a sealed volume containing primary coolant water; a nuclear reactor core disposed in a lower portion of the pressure vessel and immersed in the primary coolant water; and one or more control rod drive mechanisms (CRDMs) disposed in the pressure vessel above the nuclear reactor core and immersed in the primary coolant water. The annular steam generator is disposed outside of and secured with the pressure vessel. The annular steam generator includes: tubes having ends in fluid communication with the sealed volume of the pressure vessel; an annular wall that together with the pressure vessel defines a secondary coolant flow volume containing the tubes and not in fluid communication with the sealed volume of the pressure vessel; and a feedwater inlet and a steam outlet in fluid communication with the secondary coolant flow volume.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
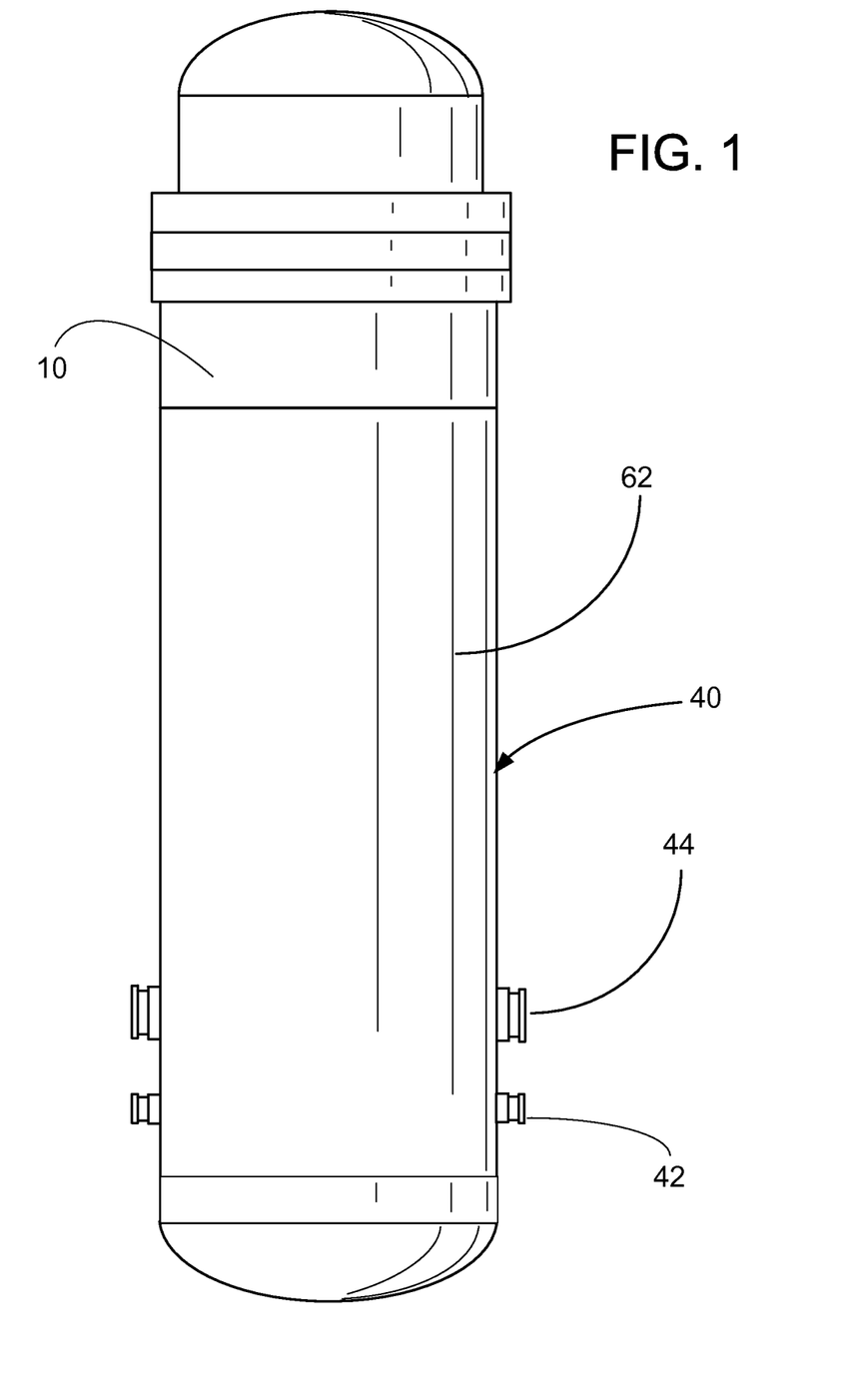
FIGS. 1 and 2 diagrammatically show a side view and a perspective sectional view, respectively, of an illustrative pressurized water reactor (PWR).
Figure 2:
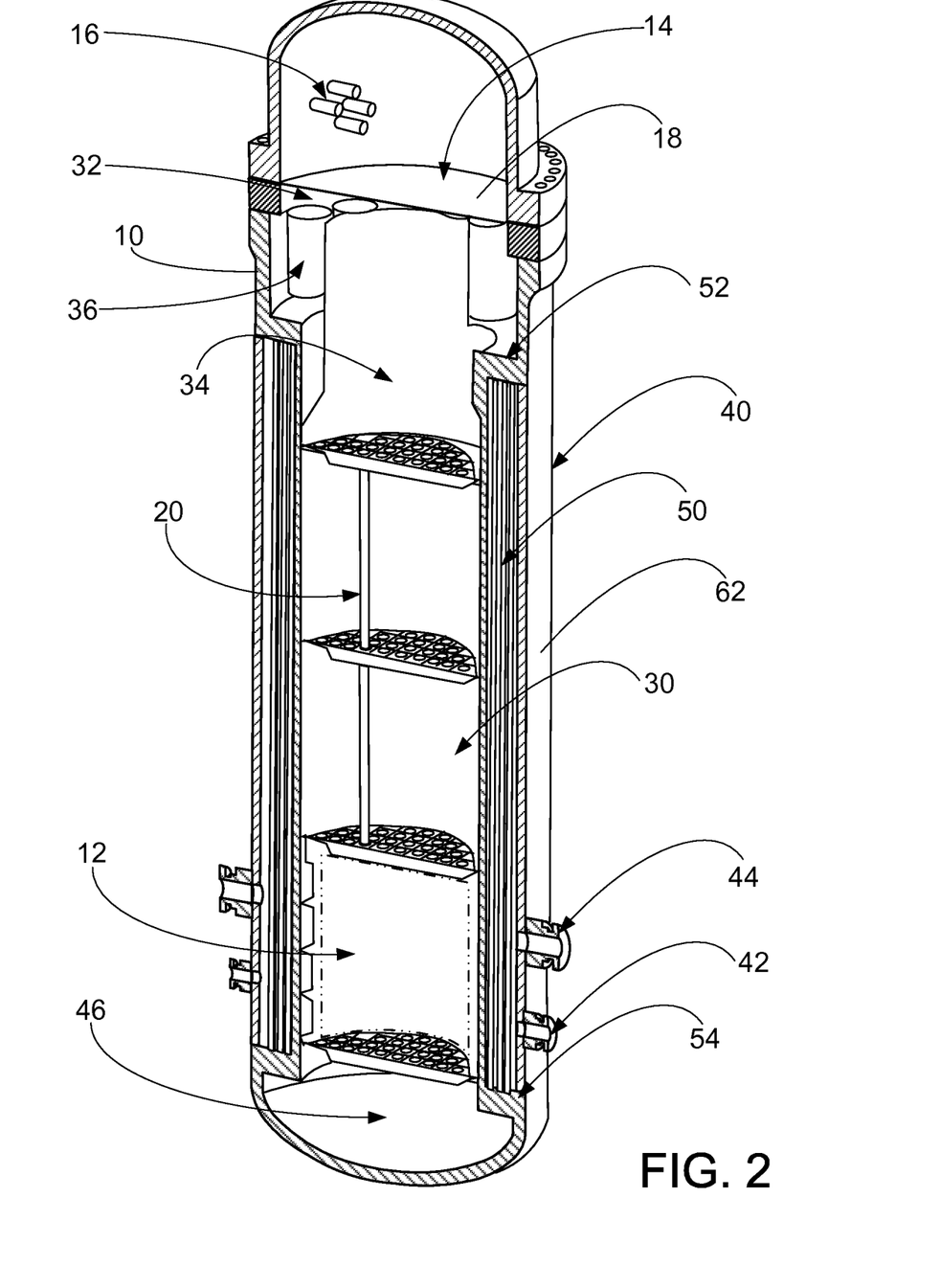

With reference to FIGS. 1 and 2, an illustrative nuclear reactor of the pressurized water reactor (PWR) type includes a pressure vessel 10 and a nuclear reactor core 12 disposed in a lower portion of the cylindrical pressure vessel 10. The pressure vessel 10 defines a sealed volume that, when the PWR is operational, contains primary coolant water in a subcooled state. Toward this end, the PWR includes an internal pressurizer disposed at the top of the pressure vessel 10. The internal pressurizer includes a steam bubble volume 14 and heaters 16 (which in some embodiments are resistive heaters) for heating water to generate the steam bubble 14. The internal pressurizer may also include other components, such as a baffle plate 18 separates the internal pressurizer volume from the remainder of the sealed volume of the pressure vessel 10, spargers (not shown) for injecting cooler water or steam into the steam bubble volume 14 to produce a reduction in pressure, and so forth.

Reactivity control is provided by control rods (not shown) that are raised and lowered by one or more control rod drive mechanism (CRDM) units 20 and are guided by control rod guide structures. (Note that in the illustrative examples of FIGS. 1 and 2, only one CRDM unit 20 is illustrated, but typically there may be a few, or tens, or hundreds of these units). The illustrative CRDM units 20 are internal CRDM units 20, by which it is meant that the CRDM units 20 are disposed inside the pressure vessel 10 above the reactor core 12. Some illustrative examples of suitable internal CRDM designs include: Stambaugh et al., "Control Rod Drive Mechanism for Nuclear Reactor", U.S. Pub. No. 2010/0316177 A1 published Dec. 16, 2010 which is incorporated herein by reference in its entirety; and Stambaugh et al., "Control Rod Drive Mechanism for Nuclear Reactor", Intl Pub. WO 2010/144563 A1 published Dec. 16, 2010 which is incorporated herein by reference in its entirety. In general, the control rods contain neutron absorbing material, and reactivity is increased by withdrawing the control rods or decreased by inserting the control rods. So-called "gray" control rods are continuously adjustable to provide incremental adjustments of the reactivity. So-called "shutdown" control rods are designed to be inserted as quickly as feasible into the reactor core to shut down the nuclear reaction in the event of an emergency. Various hybrid control rod designs are also known. For example, a gray rod may include a mechanism for releasing the control rod in an emergency so that it falls into the reactor core 12 thus implementing a shutdown rod functionality.

Although control rods are disclosed as a typical reactivity control mechanism, other reactivity control mechanisms may additionally or alternatively also be provided. For example, in some PWR designs a soluble neutron poison such as boric acid is added in controlled amounts to the primary coolant water to provide reactivity control. Additionally or alternatively, a larger quantity of boric acid may be dumped into the pressure vessel to effectuate rapid shutdown of the nuclear reaction.

In operation, the reactor core 12 heats the primary coolant water. This causes it to flow upward through a central riser region 30 of the pressure vessel 10. In the illustrative embodiment the central riser region 30 includes the CRDM units 20 and control rod guide structures. The upward flow path of the primary coolant water is sometimes referred to as the "hot leg" of the primary coolant circuit.

The upwardly flowing primary coolant water reaches an upper plenum 32 at which point the flow reverses to a downward direction in an annular outer region. Various arrangements of structures or components can be employed to implement this flow reversal. In the illustrative example, a flow baffle 34 reduces the diameter of the flow riser path before the rising primary coolant water flows into the upper plenum 32, where the baffle plate 18 provides a definite termination of the upward primary coolant flow. The flow baffle 34 defines radial space between the baffle 34 and the pressure vessel 10 for internal reactor coolant pumps 36 that drive the primary coolant water circulation. This is merely an illustrative example, and the primary coolant pumps can be located elsewhere in the primary coolant flow circuit, or wet pumps on stalks can be employed, for example coupled with the reactor head. As another alternative, the primary coolant pumps can be omitted entirely and natural circulation may be relied upon, driven by heating of the primary coolant at the core 12 and subsequent cooling of the rising primary coolant.

The downward flow path of the primary coolant water is sometimes referred to as the "cold leg" of the primary coolant circuit. In the cold leg, the primary coolant water flows downward through a steam generator 40. At the same time, secondary coolant water flows into the steam generator at a feedwater inlet 42, and flows upward through the steam generator in a path separate from that of the primary coolant water. In the steam generator 40, the downwardly flowing heated primary coolant water transfers heat to the proximate upwardly flowing secondary coolant water, eventually converting the secondary coolant into steam that exits at a steam outlet 44. The primary coolant water discharging from the lower end of the steam generator 40 flows into a lower head 46 where the flow again reverses, this time from downwardly flowing to upwardly flowing, and reenters the nuclear reactor core 12 to complete the primary coolant water flow circuit.

Figure 3:
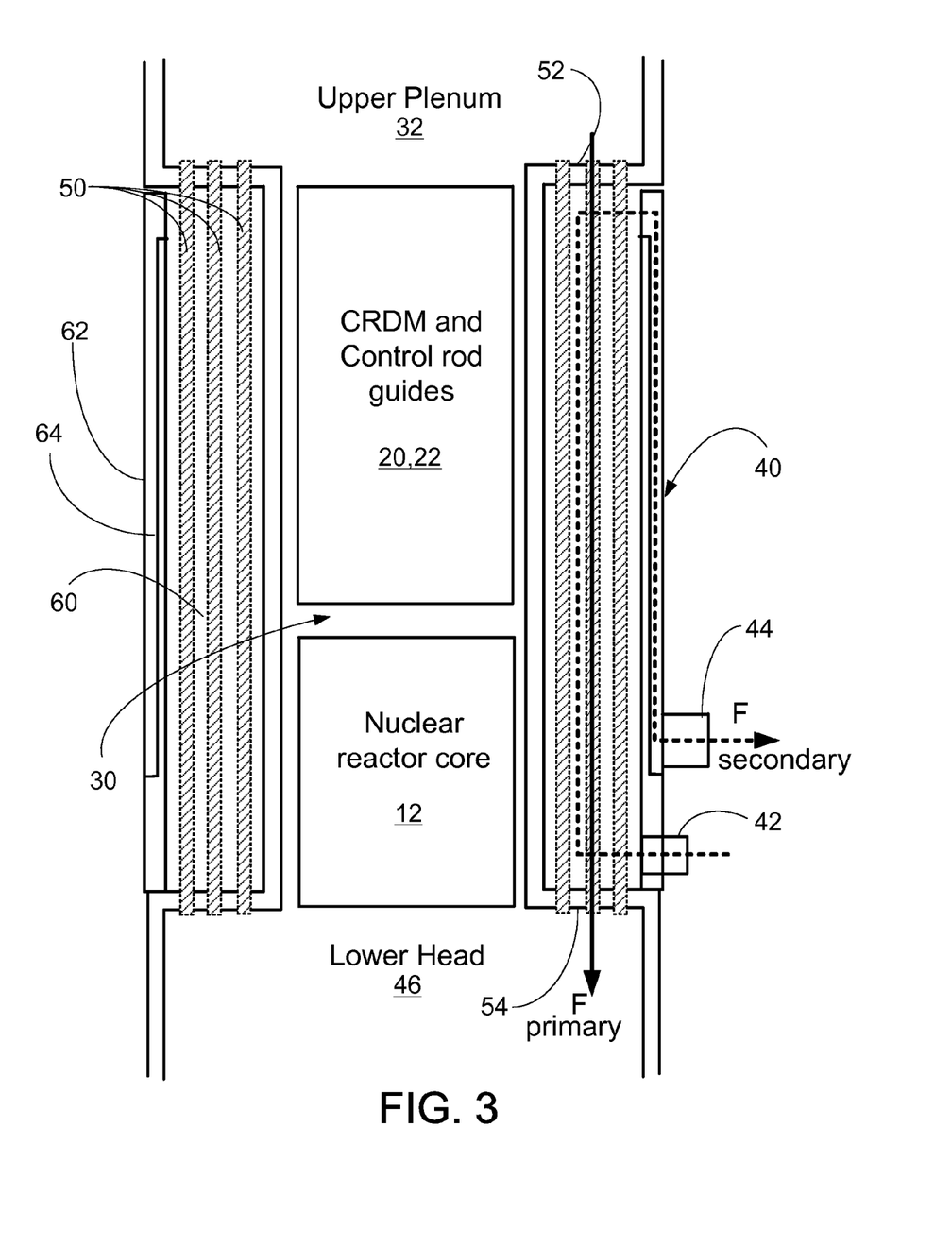
FIG. 3 diagrammatically shows additional details of the steam generator of the PWR of FIGS. 1 and 2.

With continuing reference to FIGS. 1 and 2 and with further reference to FIG. 3, in one embodiment of the steam generator 40 the downward primary coolant flows inside tubes 50 of the steam generator 40. In diagrammatic FIG. 3, only six steam generator tubes 50 are shown (two groups of three tubes located 180° apart around the axis of the cylindrical pressure vessel 10) and these are denoted by dotted lines; however, the number of steam generator tubes can be substantially higher, e.g. dozens or hundreds of steam generator tubes. The downward primary coolant flow through the tubes 50 is denoted in FIG. 3 by a solid arrow labeled $F_{primary}$. The illustrative steam generator 40 is a straight-tube once-through steam generator (OTSG) in which the tubes 50 are straight and the primary coolant flow $F_{primary}$ passes through the tube once. A first (upper) tube sheet 52 connects first (upper) ends of tubes 50 of the steam generator 40 into the pressure vessel 10, and a second (lower) tube sheet 54 connecting second (lower) ends of the tubes 50 of the steam generator 40 into the pressure vessel 10. The tubes 50 of the steam generator 40 are in fluid communication with the sealed volume of the pressure vessel 10 via the first and second tube sheets 52, 54 in order to receive and discharge, respectively, the primary coolant flow $F_{primary}$. Said another way, the upper tube sheet 52 serves as the inlet for the primary coolant flow $F_{primary}$ from the sealed volume of the pressure vessel 10 into the tubes 50, while the lower tube sheet 54 serves as the outlet for the primary coolant flow $F_{primary}$ out of the tubes and back into the sealed volume of the pressure vessel 10.

Secondary coolant flows through a secondary coolant flow volume 60 defined by a cylindrical steam generator wall 62 disposed coaxially around the pressure vessel 10. The combination of the cylindrical steam generator wall 62, the pressure vessel 10 and the first and second tube sheets 52, 54 define the sealed secondary coolant flow volume 60, which is not in fluid communication with the sealed volume of the pressure vessel 10. A secondary coolant flow $F_{secondary}$ (indicated by a multiply-bent dashed arrow in FIG. 3) flows upward through the secondary coolant flow volume 60 from the feedwater inlet 42. The secondary coolant flow volume 60 surrounds the tubes 50 (or, said another way, the tubes 50 are disposed in the secondary coolant flow volume 60) so that heat from the downwardly flowing primary coolant flow $F_{primary}$ inside the tubes is transferred to the upwardly flowing secondary coolant flow $F_{secondary}$ in the secondary coolant flow volume 60 to convert the feedwater to steam by the time it reaches the top of the steam generator 40. In the illustrative embodiment, the cylindrical steam generator wall 62 includes an outer annulus defining a steam jacket 64 (shown only in FIG. 3) via which the steam flows back downward to reach the steam outlet 44. This steam jacketing approach is optional, but has the benefit of providing a higher temperature outer surface for maintaining temperature stability. In an alternative embodiment, the steam jacket 64 is omitted and the steam outlet is located at or near the top of the steam generator.

Figure 4:
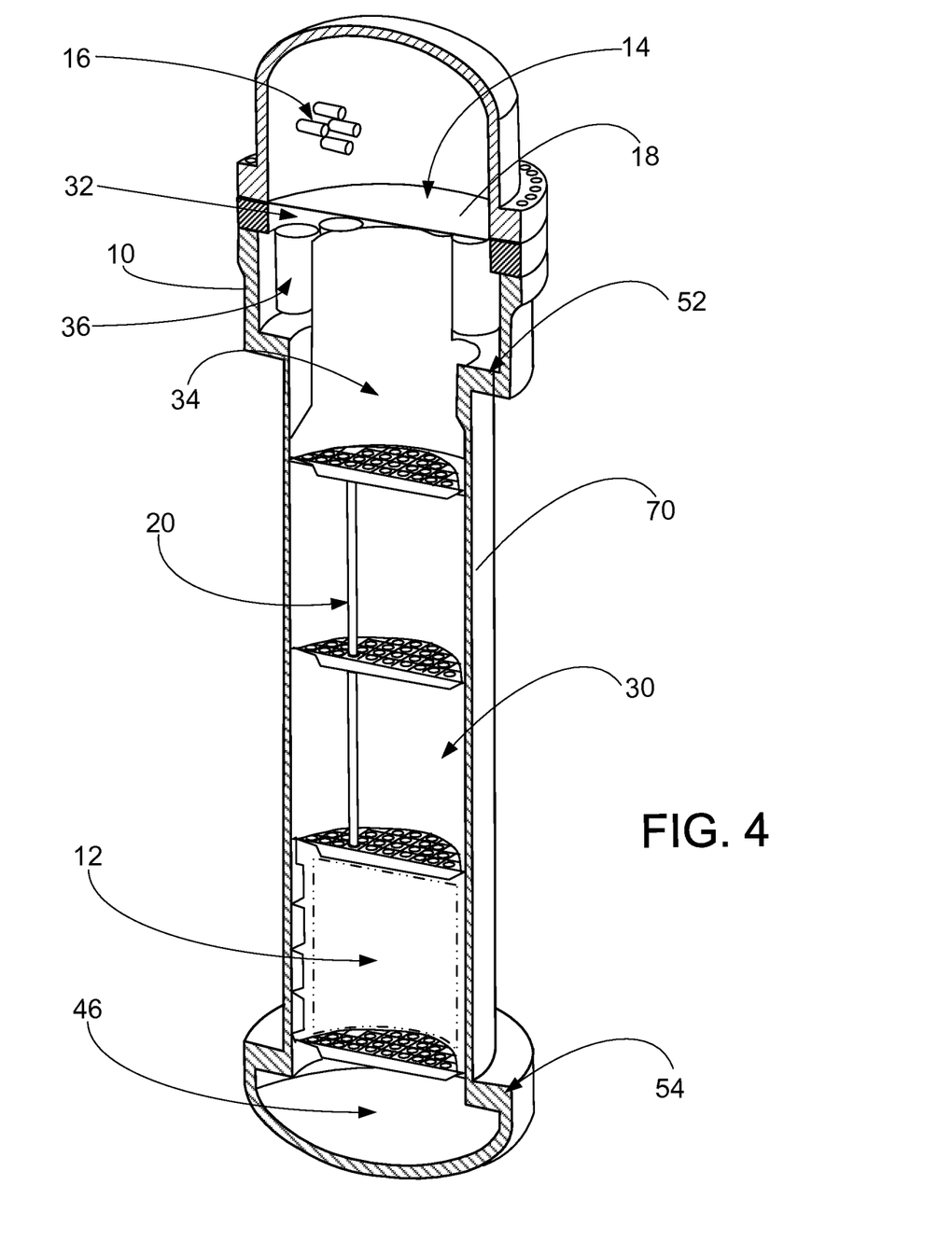
FIG. 4 diagrammatically shows a perspective sectional view of the PWR of FIGS. 1 and 2 with steam generator components removed.

With continuing reference to FIGS. 1-3 and with further reference to FIG. 4, the disclosed arrangement can be viewed as a configuration in which the annular steam generator 40 is located outside of the pressure vessel 10, but is secured with (and, in some embodiments, supported by) the pressure vessel 10. To illustrate, FIG. 4 shows the pressure vessel with components of the annular steam generator 40 omitted (that is, omitting the tubes 50, annular steam generator wall 62, feedwater inlet 42 and steam outlet 44). As best seen in FIG. 4, the cylindrical pressure vessel 10 includes an annular recess 70 that receives the annular steam generator 40. Comparing with FIGS. 1-3, it is thus seen that the sealed secondary coolant flow volume 60 is in the illustrative embodiment defined by the cylindrical steam generator wall 62, the annular recess 70, and the first and second tube sheets 52, 54. Inclusion of the annular recess 70 is optional, and in an alternative arrangement it is contemplated to omit the recess 70 and locate the annular steam generator at a larger radius from the central axis of the cylindrical pressure vessel 10. Placing the steam generator externally has substantial advantages in that it simplifies installation and maintenance of the steam generator 40.

Typically, the primary coolant flow $F_{primary}$ is at substantially higher pressure than the secondary coolant flow $F_{secondary}$. For example, in some embodiments the primary coolant pressure in the sealed volume of the pressure vessel 10 is about 2000 psia while the steam is at about 825 psia. Since the annular steam generator wall 62 operates to contain the secondary coolant flow $F_{secondary}$, it optionally is designed for the lower secondary pressure. However, since the tubes 50 carrying the primary coolant flow $F_{primary}$ are disposed in the secondary coolant flow volume 60, safety considerations and/or applicable nuclear regulatory policy of the governing jurisdiction may lead to the annular steam generator wall 62 being designed for the higher primary coolant pressure. In this case, the annular steam generator wall 62 provides primary pressure-compliant containment for the tubes 50 in the event of a tube leak.

In the illustrative embodiment, the annular steam generator 40 surrounds the nuclear reactor core 12 and the CRDM 20. This arrangement advantageously substantially reduces the vertical height of the assembly of the pressure vessel 10 and the external surrounding steam generator 40. By extending the annular steam generator 40 to encircle and vertically overlap both the nuclear reactor core 12 and the CRDM 20, as in the embodiment of FIGS. 1-4, the height of the steam generator tubes 50 can be large without a concomitant height extension of the pressure vessel 10. A compact integral PWR is thus provided.

The embodiment of FIGS. 1-4 can be summarized as follows. In the compact integral reactor design of FIGS. 1-4, the steam generator 40 is effectively outside of the reactor vessel 10. In the illustrative example, an annular straight tube steam generator employing the illustrative straight steam generator tubes 50 is employed. However, other steam generator tube layouts, such as a helical steam generator tube layout, are also contemplated. In the illustrative example of FIGS. 1-4, the reactor core 12 is located in the center of the reactor vessel 10 near the bottom of the vessel 10. Just above the core 12 is the CRDM guide structure 22 and the internal CRDM units 20. An optional flow baffle 34 reduces the diameter of the flow riser region 30 before it flows into the upper plenum 32, to provide radial space for the optional internal reactor coolant pumps 36. Primary coolant water will then travel through the upper tube sheet 52 before it flows through the steam generator tubes 50 and exits the bottom tube sheet 54 before entering the reactor vessel lower head 46. Secondary coolant enters one or more feedwater nozzles 42 travelling upward around the steam generator tubes 50 before entering an annular flow downcomer (that is, the secondary coolant flow volume 60 in the embodiment of FIGS. 1-4) which directs the flow to the steam exit nozzles 44. The integral reactor of FIGS. 1-4 operates in a subcooled region—toward this end, a separate pressurizer region is provided including a steam bubble volume 14 where a steam bubble can be formed using electrical heaters 16. In the illustrative embodiment, the steam bubble volume 14 is defined by the upper vessel head. Alternatively, an external pressurizer (not shown) can be employed, which is connected with the pressure vessel by suitable piping.

Advantages of the integral PWR of FIGS. 1-4 have already been noted. These advantages include a compact integral PWR design, and ready accessibility to the external steam generator 40 for installation and maintenance or repair. A substantial reduction in total reactor volume is obtained by placing the steam generator 40 in an annular region outside of the reactor vessel 10. Yet another advantage of the integral PWR of FIGS. 1-4 is that it can accommodate higher thermal powers by lengthening the core 12 and steam generator tubes 50 in a more compact geometry.

Figure 5:
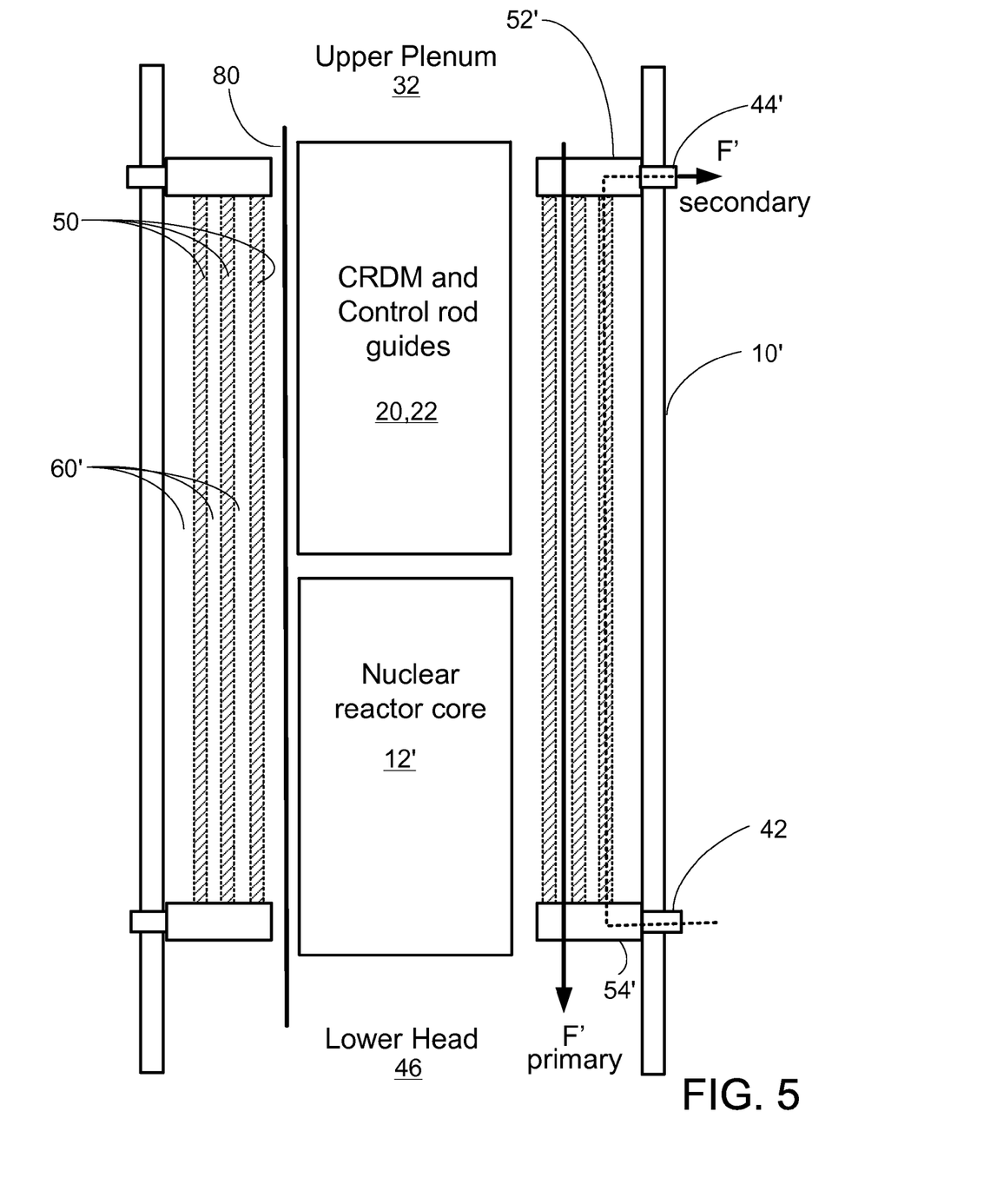
FIG. 5 diagrammatically shows details of an alternative embodiment in which the steam generator is disposed inside the pressure vessel of the PWR.

With reference to diagrammatic FIG. 5, an alternative embodiment is disclosed in which the steam generator is disposed inside the pressure vessel of the PWR. A modified pressure vessel 10' does not include the annular recess 70 shown in FIG. 4, and also omits the annular steam generator wall 62. The steam generator pipes 50' are instead disposed inside the pressure vessel 10', and an alternative secondary coolant flow volume 60' is defined as an annulus between the cylindrical wall of the pressure vessel 10' and a cylindrical riser 80 disposed coaxially inside the pressure vessel 10' and inside the steam generator. The flow pattern in the steam generator is also reversed—the primary coolant flow $F'_{primary}$ flows downwardly outside the tubes 50, while the secondary coolant flow $F'_{secondary}$ flows upwardly inside the tubes 50. Toward this end, a modified lower tube sheet 54' receives secondary coolant flow $F'_{secondary}$ from the feedwater inlet 42 and feeds into the lower ends of the tubes 50, and a modified tube sheet 52' discharges secondary coolant flow $F'_{secondary}$ from the upper ends of the tubes 50 into the steam outlet 44'. Furthermore, the steam outlet 44' is modified as compared with the steam outlet 44 of the embodiments of FIGS. 1-4 in that it is located at or near the top of the steam generator, and the steam jacket 64 shown in FIG. 3 is omitted in the embodiment of FIG. 5. The illustrative steam generator tubes 50 are again straight tubes, but alternatively helical tubing or another steam generator tubing configuration can be employed.

In the illustrative embodiment of FIG. 5, the steam generator again surrounds both the nuclear reactor core 12' and the CRDM/control rod guide tubes structure 20, 22. In the embodiment of FIG. 5 the reactor core 12' is modified as compared with the reactor core 12 of the embodiments of FIGS. 1-4 in that the core 12' is relatively longer in the vertical direction, such that the steam generator in FIG. 5 surrounds the reactor core 12' but is not coextensive with (that is, does not extend to vertically overlap with) the bottom of the elongated reactor core 12'. This illustrates the advantage that by arranging the steam generator to surround the reactor core 12' rather than placing the steam generator above the reactor core, flexibility is provided to optionally elongate the reactor core in order to achieve higher power output. (It will be appreciated that such elongation may also be employed in the embodiment of FIGS. 1-4 in which the steam generator 40 is external to but secured with the pressure vessel 10.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. An apparatus comprising:
   a pressurized water reactor (PWR) including:
      a pressure vessel including a cylindrical side wall defining an external annular recess, the pressure vessel defining and a sealed volume containing primary coolant water,
      a nuclear reactor core disposed in a lower portion of the pressure vessel and immersed in the primary coolant water, and
      a control rod drive mechanism (CRDM) disposed in the pressure vessel above the nuclear reactor core and immersed in the primary coolant water; and
   an annular steam generator disposed outside of and secured coaxially with the pressure vessel within the external annular recess, the annular steam generator including:
      tubes having ends in fluid communication with the sealed volume of the pressure vessel so that the primary coolant water flows therethrough,
      an annular wall being coaxial with the cylindrical side wall of the pressure vessel that together with the external annular recess of the pressure vessel defines an annular secondary coolant flow volume that is coaxial with the side wall of the pressure vessel, the annular secondary coolant flow volume containing the tubes and not being in fluid communication with the sealed volume of the pressure vessel, and
      a feedwater inlet and a stream outlet in fluid communication with the secondary coolant flow volume.

2. The apparatus of claim 1, wherein the annular steam generator encircles the nuclear reactor core and encircles the CRDM.

3. The apparatus of claim 2, wherein the PWR further comprises:
   an internal pressurizer disposed at the top of the pressure vessel and including a steam bubble volume and heaters for generating steam in the steam bubble volume, the annular steam generator not encircling the steam bubble volume.

4. The apparatus of claim 1, further comprising:
   an annular inlet tube sheet connecting upper ends of the tubes of the annular steam generator with the sealed volume of the pressure vessel; and
   an annular outlet tube sheet connecting lower ends of the tubes of the annular steam generator with the sealed volume of the pressure vessel;
   the annular inlet and outlet tube sheets, together with the annular wall and the pressure vessel, defining the secondary coolant flow volume,
   wherein the annular inlet and outlet tube sheets are coaxial with the cylindrical side wall of the pressure vessel.

5. The apparatus of claim 1, wherein the tubes of the steam generator comprise straight tubes and the annular steam generator is a straight-tube once-through steam generator (OTSG).

6. An apparatus comprising:
- a pressurized water reactor (PWR) including:
  - a cylindrical pressure vessel defining a sealed volume containing primary coolant water and having a cylindrical side wall defining an external annular recess, and
  - a nuclear reactor core disposed in a lower portion of the cylindrical pressure vessel and immersed in the primary coolant water, and
- an annular steam generator disposed outside of and coaxially secured with the cylindrical pressure vessel in the external annular recess of the cylindrical pressure vessel, the annular steam generator including:
  - straight tubes disposed in the annular recess of the pressure vessel and having their upper and lower ends in fluid communication with the sealed volume of the pressure vessel via annular tube sheets at respective upper and lower ends of the external annular recess so that the primary coolant water flows through the straight tubes,
  - an annular secondary coolant flow volume defined at least in part by an annular wall that is coaxial with the side wall of the pressure vessel and not in fluid communication with the sealed volume of the pressure vessel, the annular secondary coolant flow volume containing the straight tubes, and
  - a feedwater inlet and a steam outlet in fluid communication with the secondary coolant flow volume.

7. The apparatus of claim 6 further comprising:
secondary coolant water disposed in the feedwater inlet and a lower portion of the secondary coolant flow volume; and
secondary coolant steam disposed in the steam outlet and an upper portion of the secondary coolant flow volume.

8. The apparatus of claim 6 wherein the annular steam generator encircles and vertically overlaps the nuclear reactor core.

* * * * *